United States Patent [19]
Karlsson

[11] Patent Number: 5,308,019
[45] Date of Patent: May 3, 1994

[54] LEVEL-WIND MECHANISM IN A FISHING REEL

[75] Inventor: Jarding Karlsson, Svängsta, Sweden

[73] Assignee: ABU Garcia Produktion AB, Svängsta, Sweden

[21] Appl. No.: 43,766

[22] Filed: Apr. 6, 1993

[51] Int. Cl.⁵ .......................................... A01K 89/015
[52] U.S. Cl. .................................... 242/279; 242/310
[58] Field of Search ............... 242/278, 279, 280, 281, 242/310, 312

[56] References Cited

U.S. PATENT DOCUMENTS

| | | | |
|---|---|---|---|
| 1,819,724 | 8/1931 | Broadwell et al. | 242/279 |
| 3,614,015 | 10/1971 | Sussman | 242/312 |
| 4,042,186 | 8/1977 | Moosberg | 242/279 |
| 4,747,560 | 5/1988 | Karlsson | 242/280 X |
| 4,919,362 | 4/1990 | Johansson | 242/303 |
| 5,131,596 | 7/1992 | Sato | 242/279 |
| 5,158,245 | 10/1992 | Johansson | 242/261 |

*Primary Examiner*—Daniel P. Stodola
*Assistant Examiner*—Michael R. Mansen
*Attorney, Agent, or Firm*—Browdy and Neimark

[57] ABSTRACT

A level-wind mechanism in a fishing reel of the multiplier type is, as a one-piece unit, removable from and insertable in the fishing reel frame which has two side members. This unit consists of a sleeve having a longitudinal slot, an endless screw rotatably mounted in the sleeve, a level-wind mounted on the sleeve and having a groove-follower pin which via the slot in the sleeve meshes with the endless screw in order, during rotation thereof, to move the level-wind back and forth along the sleeve, and a member for preventing the level-wind from being rotated on the sleeve. The frame has a recess in each side member. The unit is inserted in these recesses such that its sleeve extends parallel to the line-spool shaft while resting on the bottom of the recesses. The unit is retained in the recesses by means of projections on two side covers mounted on a respective side member. A radial projection is provided for preventing the sleeve from being rotated in the recesses.

4 Claims, 2 Drawing Sheets

LEVEL-WIND MECHANISM IN A FISHING REEL

BACKGROUND OF THE INVENTION

The present invention relates to a level-wind mechanism in a fishing reel of the multiplier type.

Known fishing reels of the multipier type have a frame with two side members, a line-spool shaft, a line spool rotatably mounted on the line-spool shaft between said two side members, two side covers mounted on a respective side member, a mounting plate provided on one side member of the frame inwardly of the one side cover and having a spindle which is parallel to the line-spool shaft and extends through said one side cover, a handle mounted on said spindle outside said one side cover for rotating the line spool, and a driving gear mounted on said spindle to be rotated by means of the handle.

These prior-art fishing reels also have a level-wind mechanism which is adapted, upon rotation of the line spool in the direction of retrieve, i.e. the direction in which the portion of a fishing line, fixed on the line spool, that has been paid out during a cast is again wound on the line spool. Such a known level-wind mechanism is disclosed, for instance, in U.S. Pat. Nos. 4,919,362 and 5,158,245. The known level-wind mechanism has a sleeve provided with a slot extending along the sleeve. An endless screw is rotatably mounted in the sleeve and carries at one end a gear which is non-rotatably connected to the screw and meshes with the driving gear to be rotated thereby. A level-wind is mounted on the sleeve and has a groove-follower pin which via the slot in the sleeve engages the endless screw in order, upon rotation thereof, to move the level-wind back and forth along the sleeve so as to distribute the line evenly across the line spool.

The known level-wind mechanism is mounted between the two side members of the frame, the sleeve being inserted and non-rotatably mounted in a hole in each side member. It is difficult to mount the level-wind mechanism in the frame, since many of its components are mounted individually in the frame during the assembly of the level-wind itself.

SUMMARY OF THE INVENTION

The object of the present invention is to provide a level-wind mechanism which is considerably easier to assemble than the known level-wind mechanism, and which is especially well suited for assembly in an automatic assembly machine.

To this end, there is provided according to the present invention a level-wind mechanism in a fishing reel of the multiplier type, said fishing reel comprising a frame with two side members, a line-spool shaft, a line spool rotatably mounted on the line-spool shaft between said two side members, two side covers mounted on a respective side member, a mounting plate provided on one side member of the frame inwardly of the one side cover and having a spindle which is parallel to the line-spool shaft and extends through said one side cover, a handle mounted on said spindle outside said one side cover for rotating the line spool, and a driving gear mounted on said spindle to be rotated by means of the handle, said level-wind mechanism being removable from and insertable in the frame as a one-piece unit consisting of a sleeve provided with a slot extending along the sleeve, an endless screw rotatably mounted in the sleeve and carrying at one end a gear which is non-rotatably connected thereto and adapted to mesh with said driving gear to be driven thereby, a level-wind mounted on said sleeve and having a groove-follower pin which via the slot in said sleeve engages said endless screw in order, upon rotation thereof, to move the level-wind back and forth along said sleeve, and means for preventing the level-wind from being rotated on the sleeve, the frame having two recesses which are formed in a respective side member and in which said unit is so inserted that said sleeve extends parallel to the line-spool shaft while resting on the bottom of said recesses, said unit being retained in said recesses by means of projections formed on the side covers, and means being provided for preventing said sleeve from being rotated in said recesses.

The means which is provided for preventing the level-wind from being rotatated on the sleeve preferably comprises a rib formed on the sleeve and extending along it, and a groove which is formed in the level-wind and through which the rib extends.

The means which is provided for preventing the sleeve from being rotated in the recesses preferably comprises a radial projection which is formed at one end of the sleeve and which engages the boundary walls of one of said recesses.

In a preferred embodiment, the radial projection of the sleeve is inserted in a groove defined between said one side member and said mounting plate to prevent axial displacement of the sleeve in the recesses.

BRIEF DESCRIPTION OF THE DRAWINGS

The invention will be described in more detail hereinbelow with reference to the accompanying drawings, in which.

DESCRIPTION OF THE PREFERRED EMBODIMENT

Figure 1:
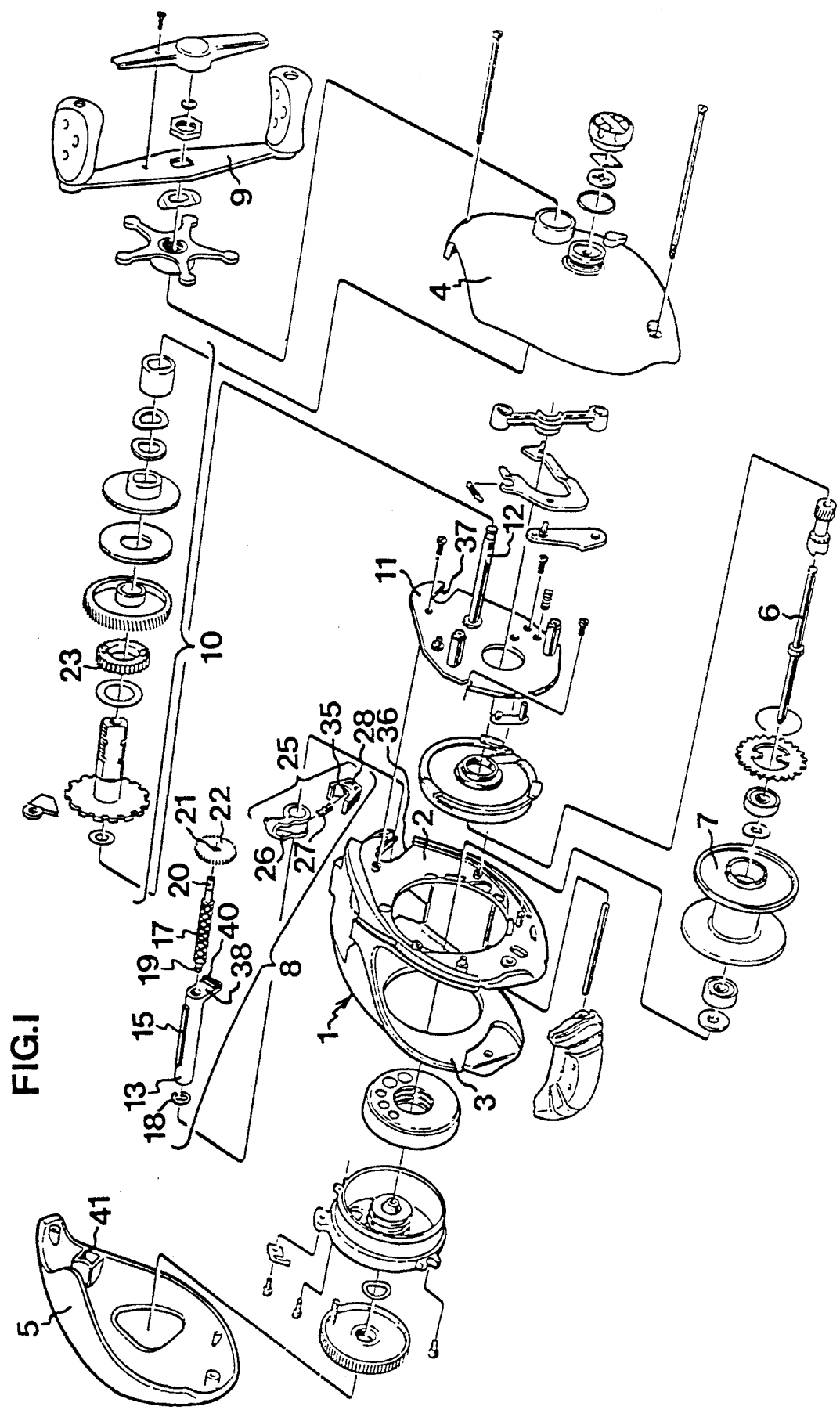
FIG. 1 is an exploded view showing a fishing reel which is provided with a level-wind mechanism according to the invention.
Figure 3:
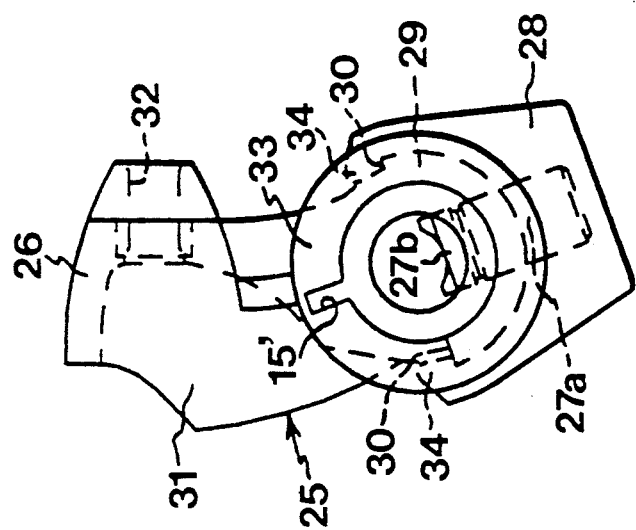
FIG. 3 is an end view showing a level-wind included in the unit of FIG. 2, as seen from the right.

The fishing reel shown in FIG. 1, which is of the multiplier type, has a frame 1 with two parallel side members 2 and 3, two detachable side covers 4 and 5, a line-spool shaft 6 extending through the frame 1, a line spool 7 for a fishing line (not shown), said line spool being rotatably mounted on the shaft 6 between the two side members 2 and 3, a level-wind mechanism 8 mounted in the frame 1, a handle 9 with an associated transmission mechanism 10 for rotating the line spool 7 and driving the level-wind mechanism 8, and a mounting plate 11 fixed on one side member 2 of the frame 1 and having a spindle 12 which is parallel to the line-spool shaft 6 and carries the handle 9 and the transmission mechanism 10.

Since it is the level-wind mechanism 8 and not the fishing reel as such that is the object of the invention, only those parts of the fishing reel which are of importance to the level-wind mechanism and its function will be described in more detail hereinafter.

Figure 2:
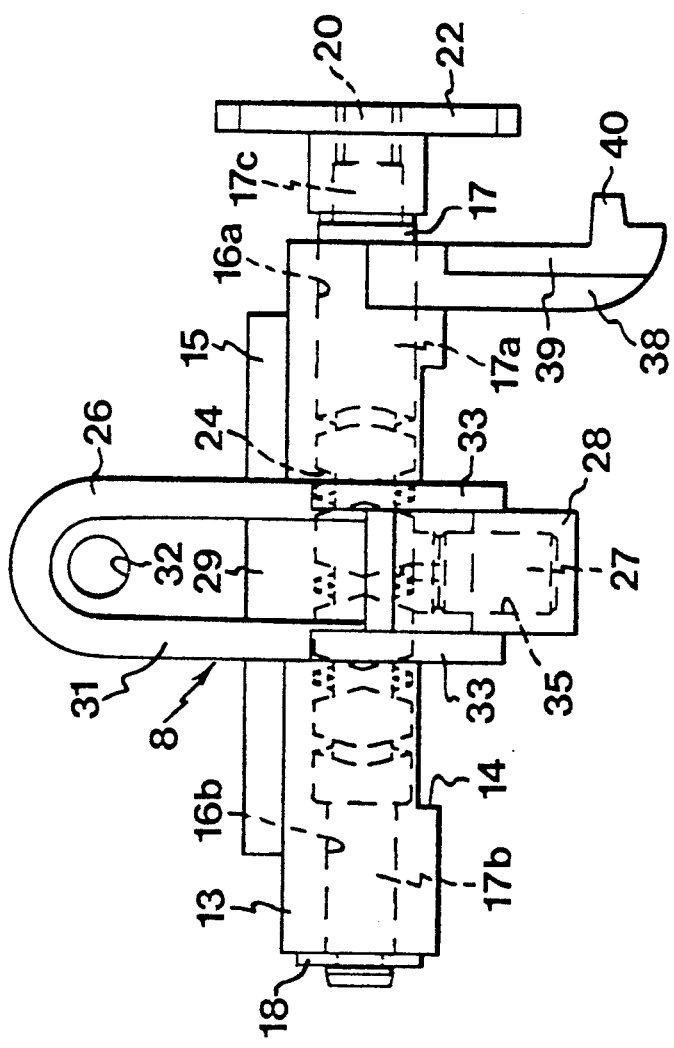
FIG. 2 is a side view showing a unit forming the level-wind mechanism according to the invention.

The level-wind mechanism 8 has a sleeve 13 which is provided with a slot 14 extending along the sleeve, and a rib 15 disposed diametrically opposite the slot 14 and extending along the sleeve. Both the slot 14 and the rib 15 extend throughout a major part of the length of the sleeve 13. The central through bore of the sleeve 13 has a long portion 16a (to the right in FIG. 2) and a short portion 16b (to the left in FIG. 2), the long portion having a larger diameter than the short portion. A screw 17, which has a long portion 17a having the same diameter as the long portion 16a of the central through bore, and a short portion 17b having the same diameter as the short portion 16b of the central through bore, is rotatably mounted in the sleeve 13, the short portion 17b of the screw 17 projecting a certain distance from one end of the sleeve 13, and its long portion 17a has a pin-like extension 17c projecting from the other end of the sleeve 13. The screw 17 is axially retained in the sleeve 13 by means of the abutment formed between the two portions 16a and 16b of the central through bore, and by means of a locking washer 18 disposed in a circumferential groove 19 in the screw portion 17b. At its free end, the screw extension 17c has a flattened portion 20 inserted in a mating center hole 21 in a gear 22, which is thus non-rotatably connected to the screw 17 for rotation thereof. The gear 22 meshes with a driving gear 23 which is included in the transmisson mechanism 10 and rotated by means of the handle 9.

The screw 17 is an endless screw and has in its thicker portion 17a an endless thread groove 24 extending helically in one direction and returning helically in the other direction.

The level-wind mechanism 8 further has a level-wind 25 which, as shown in FIG. 1, consists of three separate parts, namely a body 26, a groove-follower pin 27 and a holder 28 for the pin 27.

The body 26 has a sleeve 29 which is considerably shorter than the sleeve 13 and through which the sleeve 13 extends. The inner diameter of the sleeve 29 is equal to the outer diameter of the sleeve 13, and the sleeve 29 has an internal, axial groove 15', in which the rib 15 of the sleeve 13 engages to prevent the sleeves 13 and 29 from being rotated relative to each other.

The sleeve 29 is displaceable along the sleeve 13. Throughout one half of its circumference, the sleeve 29 has a slightly larger outer diameter than throughout the other half of its circumference, thus providing two diametrically opposed external abutments 30 on the sleeve 29. A substantially radial projection 31, having a line-guide opening 32 which is directed perpendicular to the axial direction of the sleeve 29 and through which the line (not shown) passes, is integrally formed with the sleeve 29 in its circumferential portion having the smaller outer diameter. At each end, the sleeve 29 has a radially projecting, circumferential flange 33.

The holder 28 is in the form of a U-shaped member, the two legs of which can be moved slightly apart in a resilient fashion. Each leg is provided at its free end with an inwardly directed heel 34. The holder 28 is snapped on to the sleeve 29 between the two end flanges 33 thereof in such a manner that the abutments 30 engage the heels 34 so as to retain the holder 28 on the sleeve 29. The holder 28 has an internal dead hole 35 in its web portion.

The groove-follower pin 27 has a cylindrical portion 27a which is rotatably arranged in the dead hole 35 of the holder 28, and a protruding leaf-shaped portion 27b which has substantially the same width as the endless thread groove 24 of the screw 17, and which via the slot 14 in the sleeve 13 engages in the thread groove 24.

When the handle 9 is turned in the direction of line retrieve, the line spool 7 rotates and the gear 22 and hence the screw 17 are rotated by the driving gear 23. The pin 27 follows the endless groove 24 of the screw 17, such that the level-wind 25 is moved back and forth along the sleeve 13 so as to distribute the line evenly across the line spool 7.

Each of the side members 2 and 3 has a recess 36. The recesses 36, of which only one is visible in the drawings, are aligned with each other and have at their bottom a substantially semi-circular shape of the same diameter as the sleeve 13. A corresponding recess 37 is formed in the mounting plate 11. The mounting plate 11 and the side member 2 are so designed that there exists between them a groove on each side of the recess 36 in the side member 2.

At one end, the sleeve 13 has a radial projection 38 which is integrally formed with the sleeve 13 and has substantially the same shape as the recess 36 in the side member 2. The projection 38 has substantially the same thickness as the side member 2. The projection 38 has flanges 39 which project towards the side walls of the recess 36 formed in the side member 2, and which engage in the grooves defined between the mounting plate 11 and the side member 2 on each side of the recess 36. The projection 38 has a lug 40 adjacent its radially outer end.

The level-wind mechanism 8 is inserted in the recesses 36 of the frame 1 as a one-piece unit consisting of the sleeve 13, the screw 17, the gear 22 and the level-wind 25, in such a manner that the sleeve extends parallel to the line-spool shaft 6 and engages the bottom of the recesses 36. The level-wind mechanism 8 is held in place in the recesses 36 by means of a projection 41 which is formed on the inner side of the side cover 5 and has a rounded portion, having the same diameter as the sleeve 13 and engaging the sleeve, and by means of a projection (not shown) formed on the inner side of the side cover 4 and engaging the lug 40 on the projection 38 of the sleeve 13.

As will have been appreciated, the level-wind mechanism 8 is, as a one-piece unit, removable from and insertable in the frame 1 in an extremely simple manner.

What I claim and desire to secure by Letters Patent is:

1. A level-wind mechanism in a fishing reel of the multiplier type, said fishing reel comprising a frame with two side members, a line-spool shaft, a line spool rotatably mounted on the line-spool shaft between said two side members, two side covers mounted on a respective side member, a mounting plate provided on one side member of the frame inwardly of the one side cover and having a spindle which is parallel to the line-spool shaft and extends through said one side cover, a handle mounted on said spindle outside said one side cover for rotating the line spool, and a driving gear mounted on said spindle to be rotated by means of the handle, said level-wind mechanism being removable from and insertable in the frame as a one-piece unit consisting of a sleeve provided with a slot extending along the sleeve, an endless screw rotatably mounted in the sleeve and carrying at one end a gear which is non-rotatably connected thereto and meshing with said driving gear to be driven thereby, a level-wind mounted on said sleeve and having a groove-follower pin which via the slot in said sleeve engages said endless screw in order, upon rotation thereof, to move the level-wind back and forth along said sleeve, and means for preventing the level-wind from being rotated on the sleeve, the frame having two recesses which are formed in a respective side member and in which said unit is so inserted that said sleeve extends parallel to the line-spool shaft while resting on the bottom of said recesses, said unit being retained in said recesses by means of projections formed on the side covers, and means being provided for preventing said sleeve from being rotated in said recesses.

2. A level-wind mechanism as claimed in claim 1, wherein the means for preventing the level-wind from being rotated on the sleeve comprises a rib formed on the sleeve and extending along it, and a groove which is formed in the level-wind and through which said rib extends.

3. A level-wind mechanism as claimed in claim 1, wherein the means for preventing the sleeve from being rotated in the recesses comprises a radial projection which is provided at one end of the sleeve and which engages the boundary walls of one of said recesses.

4. A level-wind mechanism as claimed in claim 3, wherein the radial projection of the sleeve is inserted in a groove defined between said one side member and said mounting plate to prevent axial displacement of the sleeve in the recesses.

* * * * *